United States Patent [19]
Dickie et al.

[11] 3,856,883

[45] Dec. 24, 1974

[54] GRADED RUBBER PARTICLES HAVING HYDROXY FUNCTIONALITY AND A POLYMERIC CROSSLINKING AGENT

[75] Inventors: Ray A. Dickie, Birmingham; Seymour Newman, Southfield, both of Mich.

[73] Assignee: Ford Motor Company, Dearborn, Mich.

[22] Filed: Mar. 15, 1974

[21] Appl. No.: 451,626

Related U.S. Application Data

[60] Continuation-in-part of Ser. No. 365,379, May 29, 1973, which is a division of Ser. No. 100,465, Dec. 21, 1970, abandoned.

[52] U.S. Cl............. 260/836, 260/837 R, 260/844, 260/856, 260/876 R, 260/881, 260/885
[51] Int. Cl....................... C08g 45/04, C08g 15/00
[58] Field of Search .......... 260/836, 837, 844, 856, 260/876, 881, 885

[56] References Cited
UNITED STATES PATENTS

| | | | |
|---|---|---|---|
| 3,598,770 | 8/1971 | Moore | 260/856 |
| 3,689,308 | 9/1972 | Johnson | 260/885 |
| 3,773,710 | 11/1973 | Victorius | 260/856 |
| 3,787,522 | 1/1974 | Dickie | 260/885 |
| 3,790,513 | 2/1974 | Victorius | 260/856 |

FOREIGN PATENTS OR APPLICATIONS

| | | | |
|---|---|---|---|
| 1,117,124 | 6/1968 | Great Britain | 260/885 |
| 986,865 | 3/1965 | Great Britain | 260/885 |

*Primary Examiner*—Paul Lieberman
*Attorney, Agent, or Firm*—Olin B. Johnson; Keith L. Zerschling

[57] ABSTRACT

Improvements in impact strength and fatigue properties of thermosets are made by incorporating therein particulate graded-rubber having functionality for reaction with constituents of the thermosets. The graded-rubber particles are characterized by having a rubbery core, a glass-like polymeric outer shell and hydroxy, surface functionality. In most thermoset systems, the thermosetable constituents, exclusive of particulate material, include a reactive prepolymer and, where applicable, a crosslinking agent. The thermosetable prepolymers illustrated for use with these hydroxy-functional, graded-rubber particles are carboxy-functional resins, epoxy-functional resins, hydroxyfunctional resins, melamine-formaldehyde resins and novalac (phenol-formaldehyde) resins.

16 Claims, No Drawings

GRADED RUBBER PARTICLES HAVING HYDROXY FUNCTIONALITY AND A POLYMERIC CROSSLINKING AGENT

This application is a continuation-in-part of copending application Serial No. 365,379 filed May 29, 1973. application Ser. No. 365,379 is a divisional application of copending application Serial No. 100,465 filed Dec. 21, 1970 and now abandoned.

This invention is concerned with the modification of thermoset materials to provide improvements in their impact strength and fatigue properties. This invention has application to the broad spectrum of thermoset materials and involves the chemical incorporation of particulate materials having unique rubber-like properties with the constituents of a thermoset reaction system. Thermosets of this invention are compatible with conventional molding techniques, e.g., compression, injection, etc., and applicable to the production of structural material as, for instance, automobile body panels, electrical appliance housings, boat construction, storage tanks, conduits, particularly those for the transmission of heated fluids, etc. These thermosets also have application in the coatings field as, for instance, in radiation curable paints.

In most instances, the thermoset constituents, exclusive of the particulate material hereinafter described, will include a reactive prepolymer and, where applicable, a crosslinking agent. The particulate material is provided with surface functionality that will react with either the prepolymer or the crosslinking agent or both.

The prepolymer may be a conventional thermosetable constituent of a thermoset system that is reactive with hydroxyfunctionality on the graded-rubber particles. These prepolymers are herein illustrated by carboxy-functional resins, epoxyfunctional resins, hydroxy-functional resins, melamine-formaldehyde resins and novalac (phenol-formaldehyde) resins.

The unique particulate material which may be termed "graded-rubber" has a rubber-like, elastomeric core of crosslinked acrylic polymer, a glass-like outer shell consisting essentially of a copolymer of about 30 to about 99 molar parts of methyl methacrylate and about 1 to about 70 molar parts of monomers copolymerizable with methyl methacrylate, at least one of which provides the particle with the desired surface functionality, and an intermediate layer consisting essentially of the copolymerization product of monomers used to form the core and the outer shell.

Particulate material of the same description excepting that the surfaces are non-functional, e.g., polymethylmethacrylate, may be used to modify these thermosets but the desirable properties obtainable with the preferred embodiments are materially diminished.

The concentration of graded-rubber particles homogeneously dispersed in the final product can be varied over a wide range in conformance with the properties desired for such product. Thus, it may be advisable in certain instances for this concentration to range upward from a minimum modifying amount to a major fraction by weight. In the main, however, the concentration and composition of the graded rubber particles will be such that the elastomeric cores will comprise a minor proportion by weight of the final product, commonly between about 5 and about 40, more commonly between about 10 and about 30, weight percent of the final product. The weight relationship of the glass-like outer shell to the elastomeric core can be varied but for most purposes the weight of the outer shell will not substantially exceed that of the core. In most instances, the average weights of the outer shells will be about 10 to 60, preferably about 20 to about 50 percent of the average weight of the cores.

Preparation of the Graded-Rubber Particles

The process for preparing these particulate materials is at least a two-stage process. A major amount of monofunctional monoacrylate is emulsion copolymerized in the first stage with a crosslinking amount of a di- or tri-functional monomer containing two or more non-conjugated terminal ethylenic groups, preferably a diacrylate, using a water-soluble free radical initiator and a suitable surfactant to yield a latex of relatively uniform particle size, e.g., 0.04 to 1 micron average diameter. Before this reaction reaches substantial completion, i.e., when the reaction is between about 50 and about 90, preferably between about 70 and about 89, percent complete, the second stage monomeric component, i.e., methyl methacrylate and one or more monomers copolymerizable therewith, is added slowly to the reaction mixture. The polymerization process is continued to yield a stable latex of relatively uniform particle size and composition as evidenced by electron microscopy. Additional surfactant may be added simultaneously with the second stage monomeric component.

The latex is coagulated, washed, and dried to yield a finely divided white powder which is suitable for blending with other constituents. field temperatures Generally, the particles are prepared from monomers that will provide a crosslinked, acrylic, rubber-like core and a glass-like polymeric outer shell at room temperature, e.g., 20°– 30°C. The terms rubber-like and glass-like are, of course, meaningless except when used in reference to a specific temperature or temperature range. The particles should be formulated so that when molded the core retains such rubber-like properties and the outer shell retains its glasslike properties at all temperatures encountered by articles of commerce in the intended field of use. Hence, for practical purposes, the monomers should be selected so that the core has a glass transition temperature that is substantially below that of the outer shell. Advantageously, the difference in glass transition temperatures between the core and the shell is at least 50°C, preferably about 100°C.

The core is formed from a major amount of an alkyl acrylate and a crosslinking amount of a di- or tri-functional monomer containing two or more non-conjugated terminal ethylenic groups. The monofunctional alkyl monoacrylate is preferably an ester of a $C_2 - C_8$ monohydric alcohol and acrylic acid, e.g., ethyl acrylate, butyl acrylate, hexyl acrylate, 2-ethyl hexyl acrylate and/or mixtures of the same. Certain other alkyl acrylates may be used when the crosslinked polymer thereof has an appropriate glass transition temperature, e.g., dodecyl methacrylate. Butyl acrylate and 2-ethyl hexyl acrylate are the most preferred of the monoacrylates for use in forming the core. The polymers produced from most methacrylates have glass transition temperatures which are too high to provide rubber-like properties at normally encountered temperatures. Hence, except for special applications, the monoacrylate component of the core will be either an ester (or esters) or acrylic acid or a mixture of a major amount of the same and a minor amount of methacrylates.

Suitable crosslinking agents include, but not by way of limitation, 1,3 - butylene diacrylate, 1,3 - butylene dimethacrylate, divinyl benzene, 1,6 - hexamethylene diacrylate, 1,6 - hexamethylene dimethacrylate, 1,1,1,-trimethylol ethane triacrylate, 1,1,1 - trimethylol ethane trimethacrylate, 1,1,1 - trimethylol propane triacrylate, 1,1,1 - trimethylol propane trimethacrylate, 1,4 - cyclohexane dimethanol dimethacrylate, allyl acrylate, allyl methacrylate, methallyl acrylate, methallyl methacrylate, diallyl maleate, diallyl fumarate, and diallyl phthalate. In one embodiment, the crosslinking agent is a diester of acrylic or methacrylic acid and a $C_2 - C_8$, preferably $C_2 - C_6$, dihydric alcohol.

In the first stage reaction, there is preferably employed about 80 to about 98 mole percent of the monofunctional monoacrylate and about 20 to about 2 mole percent of the crosslinking agent. In the second stage reaction the mixture of methyl methacrylate and monomers copolymerizable therewith are added before the first reaction ceases. The amounts of the second stage reactant or reactants relative to the combined first stage reactants may vary widely depending upon the physical properties desired in the moldings produced from these particles, i.e., from about 10 to about 90 to about 90 to about 10 weight percent.

The particulate materials can be prepared with a variety of different functional groups on the surfaces for reaction with thermoset constituents. This functionality includes, but is not limited to epoxy, carboxy, and hydroxy functionality. The outer shell is formed from methyl methacrylate and a "balance" of monomers copolymerizable therewith, at least one of which is difunctional. The minimum concentration of methyl methacrylate in the monomer mix will be about 30 mole percent. In one such embodiment, the monomer mix used will contain about 30 to about 99 mole percent methyl methacrylate, 0 to 35 mole percent of a compound or compounds selected from monovinyl hydrocarbons and other monofunctional acrylates, and about 1 to about 45, advantageously about 5 to about 40, and preferably about 10 to about 35 mole percent of one or more difunctional monoacrylates such as glycidyl methacrylate, hydroxyethyl methacrylate, hydroxy-ethyl acrylate, hydroxypropyl acrylate, hydroxypropyl methacrylate, mixtures thereof, and/or other epoxide or hydroxyl bearing monoacrylates. Carboxy functionality can be afforded by adding a small amount, e.g., 1 to 10 mole percent of acrylic or methacrylic acid to a monomer mix used to form the outer shell. This is preferably added in a last fraction of monomers to be introduced. If vinyl hydrocarbons or acrylates other than methyl methacrylate are employed with the difunctional compounds, the vinyl hydrocarbons and/or acrylates so employed are preferably the monofunctional monoacrylates and/or monofunctional vinyl hydrocarbons. Suitable monofunctional monoacrylates for this purpose include esters or acrylic or methacrylic acid with a monohydric alcohol, preferably a $C_1$ to $C_8$ monohydric alcohol, e.g., ethyl acrylate, butyl acrylate, butyl methacrylate, and 2-ethyl hexyl acrylate. A minor amount of higher alkyl acrylate, e.g., dodecyl methacrylate, may also be used. Suitable monovinyl hydrocarbons for this purpose include styrene, alphamethyl styrene, and vinyl toluene. Depending upon the end product desired, it will sometimes be advantageous to have a limited amount of crosslinking in the outer shell and hence to include with the methyl methacrylate and the difunctional monoacrylate a minor amount of a diacrylate or divinyl hydrocarbon, e.g., divinyl benzene or 1,3 - butylene diacrylate.

The physical properties of the outer shell may be otherwise modified by replacing up to about 30 mole percent of the monofunctional monoacrylate with acrylonitrile or methacrylonitrile. Likewise, one may replace up to about 30 mole percent of the monofunctional monoacrylates heretofore mentioned with an equimolar amount of isobornyl methacrylate. In each of these embodiments, as in all others, the monomer mix used to form the outer shell will contain at least about 30 mole percent methyl methacrylate.

It is also within the scope of this invention to carry out further reactions after particle formation, as for instance, to react a di- or tri- functional monomer with a functionality of said surface in order to alter the character or functionality of said surface, e.g., acrylic or methacrylic acid with epoxy-functional particles. In other embodiments, a carboxy or hydroxy functional particle may be reacted with an acyl halide e.g., methacrylyl chloride, and the resultant product further reacted in the thermoset system.

The initial monomer charge is usually emulsified by one or more micelle-forming compounds composed of a hydrophobic part, such as a hydrocarbon group containing eight or more carbon atoms, and a hydrophilic part, such as alkali metal or ammonium carboxylate groups, phosphate or sulfate partial ester groups, sulfonate groups, and the like. Exemplary emulsifying agents include alkali metal sulfonates of styrene, naphthalene, decyl benzene, and dodecyl benzene; sodium dodecyl sulfate; sodium stearate; sodium oleate; the sodium alkyl aryl polyoxymethylene sulfates and phosphates; the ethylene oxide condensates of long chain fatty acids, alcohols, and mercaptans, and the alkali metal salts of rosin acids. These materials and the techniques of their employment in emulsion formation and maintenance are well known to the art. As they are conventional materials employed in a conventional manner, further description and explanation are unnecessary.

The polymerization initiator is composed of one or more water-soluble, free-radical-generating species such as hydrogen peroxide or the sodium, potassium or ammonium persulfates, perborates, peracetates, percarbonates, and the like. As is well known in the art, these initiators may be associated with activating systems such as redox systems which may incorporate mild reducing agents such as sulfites and thiosulfites and redox reaction promoters such as transition metal ions.

A chain transfer agent or a mixture of chain transfer agents may be added to the reaction medium to limit the molecular weight of the polymer; such chain transfer agents are generally mercaptans such as dodecanethiol; benzenethiol, pentanethiol, and butanethiol.

Those skilled in the art will be aware that other emulsifying agents, polymerization initiators and chain transfer agents may be used when compatible with the polymerization system herein employed.

The reaction may be carried out at temperatures from about 40°C to 80°C, or at lower temperatures, as from 0°C to 80°C in the case of activated systems.

Determination of the concentration of reactive epoxy groups on the shell of the graded-rubber particles can be made by the method involving addition of tetraethylammonium bromide followed by titration with perchloric acid in acetic acid using crystal violet as indicator. This method is described by R. R. Jay in Analytical Chemistry, Vol. 36, page 667 (1964). Determination of the concentration of reactive hydroxyl groups on the shell of the graded-rubber particles can be made by the well-known method of analysis wherein the hydroxy groups are reacted with acetic anhydride using a pyridine catalyst. The acetic acid produced is then back titrated with sodium hydroxide. For details, see Steyermark, Quantitive Organic Analysis, pages 302-303, published by Blakiston Company, New York, Toronto, and Philadelphia (1951). For determination of hydroxyl groups, carboxyl groups and molecular weight also see the methods described by W. R. Sorenson and T. W. Campbell in "Preparative Methods of Polymer Chemistry," Interscience Publishers, New York, N.Y., U.S.A. (1961) at page 134.

This invention will be more fully understood from the following examples which illustrate the modification of typical thermoset materials with the hereinbefore described graded-rubber particles.

EXAMPLE 1

To 1000 parts by weight water which has been boiled and cooled to room temperature under a nitrogen atmosphere are added 2.86 parts by weight sodium dodecyl sulfate dissolved in 35.7 parts by weight water and about 1/9 of a monomer mixture consisting of 521 parts butyl acrylate and 48.5 parts by weight of 1,3 - butylene dimethacrylate. This mixture is stirred to establish dispersion of the monomers and 3.14 parts by weight potassium persulfate dissolved in 71.4 parts by weight water added to the stirred mixture. This mixture is heated to 45°C. After about 10 minutes, addition of the remainder of the first monomer mixture is begun at a rate such that the temperature of the reaction mixture is maintained at 47° to 50°C. During the addition of the last two-thirds of the first monomer mixture, 5.72 parts by weight sodium dodecyl sulfate dissolved in 35.7 parts by weight water are added at a substantially constant rate. The reaction mixture is maintained at 47° to 50° for about 40 minutes prior to beginning simultaneous dropwise addition of (1) 190 parts by weight of a monomer mixture consisting of methyl methacrylate, styrene, and hydroxyethyl methacrylate present in mole ratio 35:35:30, and (2) 2.86 parts by weight sodium dodecyl sulfate dissolved in 35.7 parts by weight water. This addition is carried out as such a rate that the mixture is maintained at 47° to 50°C. Following this addition, the temperature is held at 47° to 50°C, for an additional two hours. The resulting latex, known as Latex A, is cooled to room temperature.

A portion of Latex A is coagulated by adding one volume of latex rapidly but dropwise to approximately four volumes of rapidly stirred methyl alcohol which has been heated to about 60°C before beginning the coagulation. The resulting coagulum is filtered, washed, and dried in vacuo to yield a white powder hereinafter known as Powder A. Powder A is blended in a ball mill with a sufficient amount of solid epoxy resin (a condensate of epichlorohydrin and Bisphenol A of molecular weight about 1,000) to obtain a final rubber concentration (based on the core portion of the rubber particles) of 20% by weight. One hundred parts by weight of the resulting powder is heated to 120°C, and 20 parts by weight molten phthalic anhydride is added. The mixture is molded at 120°C for 1 hour, followed by 2 hours at 170°C to yield a hard insoluble article.

EXAMPLE 2

The procedure of Example 1 is repeated except for the difference that an equimolar amount of hydroxyethyl acrylate is substituted for the hydroxyethyl methacrylate.

EXAMPLE 3

The procedure of Example 1 is repeated except for the difference that an equimolar amount of hydroxypropyl methacrylate is substituted for the hydroxyethyl methacrylate.

EXAMPLE 4

The procedure of Example 1 is repeated except for the difference that an equimolar amount of hydroxypropyl acrylate is substituted for the hydroxyethyl methacrylate.

EXAMPLE 5

To 1000 parts by weight water which has been boiled and cooled to room temperature under a nitrogen atmosphere are added 2.86 parts by weight sodium dodecyl sulfate dissolved in 35.7 parts by weight water and about 1/6 of a monomer mixture consisting of 348 parts by weight butyl acrylate and 32.3 parts by weight 1,3 - butylene dimethacrylate. The mixture is stirred to establish dispersion of the monomers. To the stirred mixture are added 3.14 parts by weight potassium persulfate dissolved in 71.4 parts by weight water. The mixture is heated to 45°C. After about 10 minutes, addition of the remainder of the first monomer mixture is begun at a rate such that the temperature of the reaction mixture is maintained at 47° to 49°C. The last half of the first monomer mixture is added simultaneously with 2.86 parts by weight of sodium dodecyl sulfate dissolved in 35.7 parts by weight water. Addition of the first monomer mixture requires about 45 minutes. The reaction mixture is maintained at 47° to 49°C for 35 minutes prior to beginning simultaneous dropwise addition of (1) a mixture of 296.5 parts by weight methyl methacrylate, 73.5 parts by weight hydroxypropylmethacrylate, and 2.57 parts by weight 1 - dodecanethiol, and (2) a solution of 5.72 parts by weight sodium dodecyl sulfate in 35.7 parts by weight water. This addition, which requires about 40 minutes, is carried out at such a rate that the temperature of the reaction mixture is maintained at 47° to 49°C. Following this addition, the mixture is maintained at 47° to 49°C for an additional two hours. The resulting latex, known hereinafter as Latex B, is cooled to room temperature and neutralized with aqueous ammonia. The overall conversion of monomers is about 98%. The average size of these particles is in the range of 0.1 to 0.2 micron.

A thermoset prepolymer emulsion is prepared in the following way: To 800 parts by weight water which has been boiled and cooled to room temperature under a nitrogen atmosphere are added 4 parts by weight sodium dodecyl sulfate in 25 parts by weight water and about one-third of a mixture consisting of 186.6 parts by weight methyl methacrylate, 113.4 parts by weight glycidyl methacrylate, and 2.0 parts by weight 1 - dodecanethiol. The mixture is stirred to establish dispersion of the monomers. To the stirred mixture is added 3.2 parts by weight potassium persulfate dissolved in 75 parts by weight water. The mixture is heated to about 55°C. After the initial exotherm has subsided, the remainder of the monomer mixture is added at a rate such that the temperature of the reaction mixture is maintained at about 55°C. Following this addition, the reaction mixture is maintained at about 55°C for an additional two hours. The resulting latex is cooled to room temperature and blended with a sufficient amount of Latex B to yield a molding compound containing about 25% rubber (based on the core portion of the graded-rubber particles). The mixed emulsion is coagulated by adding one volume of latex to approximately 8–10 volumes of methyl alcohol acidified with 0.001 volume concentrated hydrochloric acid. The coagulum is further washed with methyl alcohol, a catalytic amount (about 1% by weight based on the cpoxy-bearing portion of the blend) of 2 - ethyl - 4 - methyl - imidazole is added, and a molding powder is isolated by drying in vacuo. The molding powder is compression molded at 400°F for 15 minutes to yield a hard article which is by comparison much tougher than a similar article prepared without incorporation of graded-rubber particles.

EXAMPLE 6

A thermoset prepolymer is prepared by adding a mixture of 30.0 parts by weight methacrylic acid, 23.4 parts by weight methacrylonitrile, 46.6 parts by weight methyl methacrylate, and 3.7 parts by weight di-t-butyl perbenzoate slowly, dropwise over a 3 to 4 hour period to sufficient refluxing dioxane to result in a final concentration of polymer of about 30% by weight. The solution is coagulated by dropwise addition to 5 to 7 volumes of rapidly stirred hexane. The prepolymer is filtered and dried in vacuo. A 20% by weight total solids solution is then prepared in dioxane comprising the prepolymer, a stoichiometric amount of the diglycidyl ether of Bisphenol A, and a catalytic amount (about 1.0% by weight based on prepolymer) of N, N-dimethyl benzyl amine. This solution is used in preparation of rubber reinforced molding compounds in the following way. A latex is prepared according to the procedures given for Latex A (Example 1) with the differences that (1) the first monomer mixture comprises 90 mole percent butyl acrylate and 10 mole percent 1,3 - butylene dimethacrylate and (2) the second monomer mixture comprises 65 mole percent methyl methacrylate, 25 mole percent hydroxypropylmethacrylate, and 10 mole percent 1,3 - butylene dimethacrylate. This latex is coagulated by addition of one volume of latex to four volumes of methanol acidified with 0.001 volume concentrated hydrochloric acid. The coagulum is isolated by gentle centrifugation and is subsequently dispersed (without drying) in dioxane to yield a dispersion containing about 15% solids. This dispersion is blended with the thermoset prepolymer-crosslinker-catalyst solution; the mixture is freeze-dried and the resulting molding powder is compression molded to yield a hard article insoluble in acetone. Elongation-to-break is found to be monotonically increasing function of rubber content, at least up to 25% by weight rubber (based on the core portion of the graded-rubber particles). Specimens containing 25% weight rubber (based on the core portion of the graded-rubber particles) are found to have an elongation-to-break at least double that of specimens omitting the rubber.

EXAMPLE 7

Graded-rubber particles are prepared according to the procedure given in Example 1 for Powder A (hydroxyfunctional rubber particles) with the difference that the outer shell of the particles is formed from a monomer mixture comprising methyl methacrylate, butyl acrylate, and hydroxyethyl methacrylate present in mole ratio 55:35:10; this material is crushed to a very fine powser at about 80°C and is hereinafter referred to as Powder C. The latex precursor of Powder C is designated Latex C.

One hundred parts by weight of a commercial grade DGEBA (diglycidyl ether of Bisphenol A) of equivalent weight about 190 is mixed with 10 parts by weight phenyl glycidyl ether, twelve parts by weight triethylene tetramine, and fifty parts by weight Powder C. The mixture is thoroughly blended using a Brabender mixer equipped with sigma blades. The mixture is molded and allowed to cure at room temperature for seven days followed by a two hour postcure at 60°C to yield a hard, translucent, rubber-modified epoxy resin.

EXAMPLE 8

Two hundred parts by weight Latex C (hydroxy-functional rubber particles) are blended with 100 parts by weight wood flour. The mass is dried in vacuo at 40°C for 24 hours, blended with 100 parts by weight of a commercial grade DGEBA of equivalent weight 190 and three parts by weight boron trifluoride monoethylamine. The mixture is molded at 120°C for one hour followed by a post cure at 150°C for two hours.

EXAMPLE 9

A mixture of 100 parts by weight melamine and 290 parts by weight 37% neutralized aqueous formaldehyde is stirred and heated at reflux for 40 minutes. The reaction mixture is cooled to room temperature and thoroughly mixed with 100 parts by weight wood flour, one part by weight zinc stearate, and 200 parts by weight Latex A (hydroxy-functional rubber particle). The mass is dried for four hours at 70°– 80°C, ground to a uniform powder and compression molded at 150°C for 15 minutes to yield a hard article insoluble in acetone.

EXAMPLE 10

Fifty parts by weight finely ground novolac (phenol-formaldehyde resin), 50 parts by weight dry wood flour, 7 parts by weight hexamethylene-tetramine, 2 parts by weight magnesium oxide, 1 part by weight calcium stearate, and 20 parts by weight Powder A (hydroxy-functional rubber particles) are blended in a ball mill. The blend is compression molded at 160°C for 5 minutes to give a hard, insoluble article.

EXAMPLE 11

A thermoseting prepolymer is prepared from 20 parts by weight 2 - hydroxypropyl acrylate, 70 parts styrene, 10 parts butyl acrylate, and 4 parts AIBN [2,2' - azobis (2-methylpropionitrile)]. These materials are blended together and added dropwise over an one and one-half hour period to a mixture of 150 ml toluene and 150 ml methylethylketone maintained at reflux in a one-liter flask. After the monomer addition is complete, 0.5 g AIBN in 20 g toluene is added dropwise; the refluxing is continued for an additional hour to complete the polymerization. The resulting solution is blended with a dispersion of Powder A (hydroxy-functional graded urbber particles from Example 1 in an equal volume mixture of toluene and methylethylketone in proportion three parts prepolymer to one part graded-rubber particles. This mixture is dried until its solvent content is below 3%; the dried mixture is ground to pass through a 20 mesh screen.

Four hundred parts of the resulting powder are mixed with 35 parts phthalic anhydride, 3 parts stannic chloride, 1.5 parts polybutyl acrylate ($M_n = 5000$), and titanium dioxide, 30 parts. The materials are mixed together in a ball mill for 2 hours, mill rolled at 85° to 90°C for five minutes, and finally ground in a ball mill to form a 140 mesh screen.

The resulting powder is sprayed on an electrically grounded, steel panel by using an electrostatic powder spray gun. After spraying, the panel is heated to 180°C for 30 minutes. The coating obtained is hard, insoluble in acetone and more flexible than a similar coating from which the graded-rubber particles are omitted.

EXAMPLE 12

The procedures of Example 11 are repeated with the difference that the ground polymer mixture is blended with hexamethoxymethyl melamine (2.5 parts per hundred parts to polymer), p-toluene sulfonic acid (1 phr), polylaurylmethacrylate ($M_n = 5000$) (1.2 phr), and 6 phr carbon black. The coatings so obtained are hard, tough and insoluble in acetone.

EXAMPLE 13

The procedure of Example 1 is repeated except for the difference that an equimolar amount of tetrahydrophthalic anhydride is substituted for the phthalic anhydride.

EXAMPLE 14

The procedure of Example 5 is repeated except for the difference that an equimolar amount of glycidyl acrylate is substituted for the glycidyl methacrylate.

EXAMPLE 15

The procedure of Example 1 is repeated except for the difference that an equimolar amount of divinyl benzene is substituted for the 1,3 0 butylene dimethacrylate used in forming the core of the graded-rubber particles.

EXAMPLE 16

The procedure of Example 1 is repeated except for the difference that 0.7 mole of trimethylolpropanetriacrylate is substituted for each mole of the 1,3 - butylene dimethacrylate used in forming the core of the graded-rubber particles.

The term "copolymer" is used herein to mean a polymer formed from 2 or more different polymerizable compounds.

We claim:

1. In a method for forming a thermoset material wherein a crosslinkable resin and a crosslinking amount of a crosslinking agent reactive therewith are intimately mixed and reacted with each other, the improvement wherein:
    A. said crosslinking agent is a graded-rubber particle consisting essentially of
        1. about 10 to about 90 weight percent of a core of crosslinked acrylic polymer consisting essentially of
            a. a minor and crosslinking amount of a di- or trifunctional monomer containing 2 or more non-conjugated terminal ethylenic groups, said minor and crosslinking amount not exceeding about 20 mole percent of the core reactants, and
            b. a remainder consisting essentially of a monofunctional monoacrylate, said remainder constituting at a minimum about 80 mole percent of the core reactants,
        2. about 90 to about 10 weight percent of an outer shell having glass transition temperature above that of said core and consisting essentially of the polymerization product of a mixture of about 30 to about 98 mole percent methyl methacrylate, 0 to about 68 mole percent of unsaturated monomers selected from monofunctional monoacylates, diacrylates, monovinyl hydrocarbons, and about 2 to about 35 mole percent of a monomer having an olefinic group reactable with said methyl methacrylate and a hydroxyfunctional group which
            a. remains unreacted in said polymerization and
            b. provides said shell with hydroxy surface-functionality that is reactive with said crosslinkable resin, and
    B. said crosslinkable resin is selected from melamine-formaldehyde resins, copolymers of unsaturated monomers having repeating functional groups selected from carboxy functionality, epoxy functionality, and hydroxy functionality, and a polyepoxide having at least two epoxide groups per molecule.

2. A method in accordance with claim 1 wherein said core is formed from about 80 to about 98 mole percent of an ester of acrylic acid and a $C_2 - C_8$ monohydric alcohol and about 2 to about 20 mole percent of a divinyl benzene, a diester of acrylic or methacrylic acid and a $C_2 - C_8$ dihydric alcohol or a triester of acrylic or methacrylic acid and a $C_2 - C_8$ trihydric alcohol.

3. A method in accordance with claim 1 wherein said crosslinkable resin is an epoxy-functional copolymer of unsaturated monomers.

4. A method in accordance with claim 1 wherein said crosslinkable resin is a hydroxy-functional copolymer of unsaturated monomers.

5. A method in accordance with claim 1 wherein said crosslinkable resin is a polyepoxide having at least two epoxide groups per molecule.

6. In a method for forming a thermoset material wherein a crosslinkable resin which is a copolymer of unsaturated monomers and has repeating functional groups selected from carboxy-functionality, epoxy-functionality and hydroxy-functionality is intimately mixed with crosslinking amounts of a polyepoxide having at least 2 epoxide groups per molecule and said crosslinkable resin and said polyepoxide are subsequently reacted with each other, the improvement wherein said polyepoxide and said crosslinkable resin are intimately mixed prior to reaction with graded-rubber particles, said graded-rubber particles consisting essentially of 1. about 10 to about 90 weight percent of a core of crosslinked acrylic polymer consisting essentially of a. a minor and crosslinking amount of a di- or trifunctional monomer containing 2 or more non-conjugated terminal ethylenic groups, said minor and crosslinking amount not exceeding about 20 mole percent of the core reactants, and b. a remainder consisting essentially a monofunctional monoacrylate, said remainder constituting at a minimum about 80 mole percent of the core reactants, 2. about 90 to about 10 weight percent of an outer shell having glass transition temperature above that of said core and consisting essentially of the polymerization product of a mixture of about 30 to about 98 mole percent methyl methacrylate, 0 to about 68 mole percent of unsaturated monomers selected from monofunctional monoacrylates, diacrylates, monovinyl hydrocarbons, and about 2 to about 35 mole percent of a monomer having an olefinic group reactable with said methyl methacrylate and a hydroxy-functional group which a. remains unreacted in said polymerization and b. provides said shell with hydroxy surfacefunctionality that is reactive with said crosslinkable resin.

7. A method in accordance with claim 6 wherein said core is formed from about 80 to about 98 mole percent of an ester or acrylic acid and a $C_2 - C_8$ monohydric alcohol and about 2 to about 20 mole percent of a divinyl benzene, a diester of acrylic or methacrylic acid and a $C_2 - C_8$ dihydric alcohol or a triester of acrylic or methacrylic acid and a $C_2 - C_8$ trihydric alcohol.

8. A method in accordance with claim 6 wherein the functionality of said copolymer is epoxy-functionality.

9. A method in accordance with claim 6 wherein the functionality of said copolymer is hydroxy-functionality.

10. A method in accordance with claim 6 wherein the functionality of said copolymer is carboxy-functionality.

11. In a thermoset material wherein a crosslinkable resin and a crosslinking amount of a crosslinking agent reactive therewith are intimately mixed and reacted with each other, the improvement wherein A. said crosslinking agent is a graded-rubber particle consisting essentially of 1. about 10 to about 90 weight percent of a core of crosslinked acrylic polymer consisting essentially of a. a minor and crosslinking amount of a di- or trifunctional monomer containing 2 or more non-conjugated terminal ethylenic groups, said minor and crosslinking amount not exceeding about 20 mole percent of the core reactants, and b. a remainder consisting essentially of a monofunctional monoacrylate, said remainder constituting at a minimum about 80 mole percent of the core reactants, 2. about 90 to about 10 weight percent of an outer shell having glass transition temperature above that of said core and consisting essentially of the polymerization product of a mixture of about 30 to about 98 mole percent of methyl methacrylate, 0 to about 68 mole percent of unsaturated monomers selected from monofunctional monoacrylates, diacrylates, monovinyl hydrocarbons, and about 2 to about 35 mole percent of a monomer having an olefinic group reactable with said methyl methacrylate and a hydroxy-functional group which a. remains unreacted in said polymerization and b. provides said shell with hydroxy surfacefunctionality that is reactive with said crosslinkable resin, and B. said crosslinkable resin is selected from melamine-formaldehyde resins, novalac (phenol-formaldehyde) resins, copolymers of unsaturated monomers having repeating functional groups selected from carboxy functionality, eposy functionality, and hydroxy functionality, and a polyepoxide having at least two epoxide groups per molecule.

12. A method in accordance with claim 11 wherein said core is formed from about 80 to about 98 mole percent of an ester of acrylic acid and a $C_2 - C_8$ monohydric alcohol and about 2 to about 20 mole percent if divinyl benzene, a diester of acrylic or methacrylic acid and a $C_2 - C_8$ dihydric alcohol or a triester of acrylic or methacrylic acid and a $C_2 - C_8$ trihydric alcohol.

13. A thermoset material in accordance with claim 12 wherein said crosslinkable resin is an epoxy-functional copolymer of unsaturated monomers.

14. A thermoset material in accordance with claim 12 wherein said crosslinkable resin is a hydroxy-functional copolymer of unsaturated monomers.

15. A thermoset material in accordance with claim 12 wherein said crosslinkable resin is a hydroxy-functional copolymer of unsaturated monomers.

16. In a thermoset material wherein a crosslinkable resin which is a copolymer of unsaturated monomers and has repeating functional groups selected from carboxy-functionality, epoxy-functionality and hydroxy-functionality and crosslinking amounts of a polyepoxide having at least 2 epoxide groups per molecule are intimately mixed and reacted with each other, the improvement wherein said polyepoxide and said crosslinkable resin are intimately mixed and reacted with graded-rubber particles, said graded-rubber particles consisting essentially of 1. about 10 to about 90 weight percent of a core of crosslinked acrylic polymer consisting essentially of a. a minor and crosslinking amount of a di- or trifunctional monomer containing 2 or more non-conjugated terminal ethylenic groups, said minor and crosslinking amount not exceeding about 20 mole percent of the core reactants, and b. a remainder consisting essentially of a monofunctional monoacrylate, said remainder constituting at a minimum about 80 mole percent of the core reactants, 2. about 90 to about 10 weight percent of an outer shell having glass transition temperature above that of said core and consisting essentially of the polymerization product of a mixture of about 30 to about 98 mole percent methyl methacrylate, 0 to about 68 mole percent of unsaturated monomers selected from monofunctional monoacrylates, diacrylates, monovinyl hydrocarbons, and about 2 to about 35 mole percent of a monomer having an olefinic group reactable with said methyl methacrylate and a hydroxy-functional group which a. remains unreacted in said polymerization and b. provides said shell with hydroxy surface-functionality that is reactive with said crosslinkable resin.

* * * * *